US011778407B2

(12) United States Patent
Chu et al.

(10) Patent No.: US 11,778,407 B2
(45) Date of Patent: Oct. 3, 2023

(54) CAMERA-VIEW ACOUSTIC FENCE

(71) Applicant: Plantronics, Inc., Santa Cruz, CA (US)

(72) Inventors: Peter L. Chu, Lexington, MA (US); Stephen C. Botzko, Reading, MA (US)

(73) Assignee: Plantronics, Inc., Santa Cruz, CA (US)

( * ) Notice: Subject to any disclaimer, the term of this patent is extended or adjusted under 35 U.S.C. 154(b) by 175 days.

(21) Appl. No.: 17/444,828

(22) Filed: Aug. 10, 2021

(65) Prior Publication Data

US 2023/0053202 A1 Feb. 16, 2023

(51) Int. Cl.
| G10L 21/0216 | (2013.01) |
| H04S 7/00 | (2006.01) |
| H04N 23/58 | (2023.01) |
| H04N 7/14 | (2006.01) |
| H04N 7/15 | (2006.01) |

(52) U.S. Cl.
CPC .......... *H04S 7/303* (2013.01); *G10L 21/0216* (2013.01); *H04N 7/147* (2013.01); *H04N 7/15* (2013.01); *H04N 23/58* (2023.01); *G10L 2021/02166* (2013.01)

(58) Field of Classification Search
CPC ...... G06F 3/167; G06V 40/16; G06V 40/161; G10L 21/0216; G10L 21/0232; G10L 2021/02166; G10L 25/78; H04N 7/142; H04N 7/147; H04N 7/15; H04N 23/58; H04R 3/005; H04S 7/303; G06T 7/70; G06T 15/005; G08B 25/01; H04W 76/14
See application file for complete search history.

(56) References Cited

U.S. PATENT DOCUMENTS

| 6,912,178 | B2 | 6/2005 | Chu | |
| 8,384,542 | B1 * | 2/2013 | Merrill | G08B 25/01 340/541 |
| 9,215,543 | B2 * | 12/2015 | Sun | G06V 40/16 |
| 9,794,511 | B1 * | 10/2017 | McQueen | H04N 7/142 |
| 10,134,414 | B1 * | 11/2018 | Feng | G01S 3/8083 |
| 10,490,202 | B2 | 11/2019 | Feng | |

(Continued)

FOREIGN PATENT DOCUMENTS

EP 1643769 A1 4/2006

OTHER PUBLICATIONS

Poly, "Poly Video Mode Administrator Guide 3.2.0," Aug. 2020, pp. 1-6, 9, 10, 91, 92.

(Continued)

*Primary Examiner* — Gerald Gauthier
(74) *Attorney, Agent, or Firm* — QUARLES & BRADY LLP

(57) ABSTRACT

Determining the angle of sound relative to the centerline of a microphone array. The angle of the centerline of a camera field-of-view (FoV) and the angle of the camera FoV is determined. Knowing the angle from the centerline of the microphone array of the particular sound and then the angle of the centerline of the camera FoV and angles of the camera FoV allows a determination if the sound is inside the FoV of the camera. If so, the microphones are unmuted. If not, the microphones are muted. As the camera zooms or pans, the changes in camera FoV and centerline angle are computed and used with the sound angle, so that the muting and unmuting occurs automatically as the camera zoom and pan angle change.

17 Claims, 14 Drawing Sheets

(56) References Cited

U.S. PATENT DOCUMENTS

| | | | | |
|---|---|---|---|---|
| 10,778,941 | B1 | 9/2020 | Childress, Jr. et al. | |
| 11,677,428 | B2* | 6/2023 | Ruttier | H04W 76/14 |
| | | | | 381/370 |
| 2003/0202107 | A1* | 10/2003 | Slattery | H04N 7/142 |
| | | | | 348/207.99 |
| 2004/0001137 | A1* | 1/2004 | Cutler | H04N 23/58 |
| | | | | 348/14.09 |
| 2010/0110071 | A1* | 5/2010 | Elsberg | G06T 15/005 |
| | | | | 345/419 |
| 2011/0285808 | A1* | 11/2011 | Feng | H04N 7/142 |
| | | | | 348/E7.083 |
| 2013/0044893 | A1* | 2/2013 | Mauchly | H04N 7/15 |
| | | | | 381/92 |
| 2015/0201278 | A1* | 7/2015 | Bao | H04R 3/005 |
| | | | | 381/92 |
| 2015/0341545 | A1* | 11/2015 | Lee | H04N 7/142 |
| | | | | 348/14.16 |
| 2018/0343534 | A1* | 11/2018 | Norris | G06V 40/161 |
| 2019/0313187 | A1* | 10/2019 | Stoltze | G10L 21/0232 |
| 2020/0110572 | A1* | 4/2020 | Lenke | G06F 3/167 |
| 2022/0400216 | A1* | 12/2022 | Wang | G10L 25/78 |
| 2022/0408015 | A1* | 12/2022 | Wang | H04N 7/147 |
| 2022/0408029 | A1* | 12/2022 | Wang | G06T 7/70 |
| 2023/0053202 | A1* | 2/2023 | Chu | G10L 21/0216 |

OTHER PUBLICATIONS

Arun Asokan Nair, Austin Reiter, Changxi Zheng, Shree Nayar; Snap Research; "Audiovisual Zooming: What You See Is What You Hear"; MM '19: Proceedings of the 27th ACM International Conference on Multimedia; Oct. 2019; pp. 1107-1118 and video at https://www.youtube.com/watch?v=PgCrRtBkwxQ.

Exner, Alfred, "Extended European Search Report dated Sep. 22, 2022", EP Patent Application No. 22167500.2, European Intellectual Property Office, dated Sep. 22, 2022.

Horii, et al., "Speaker Detection Using the Timing Structure of Lip Motion and Sound", Computer Vision and Pattern Recognition Workshops, Computer Society Conference, IEEE, Jun. 23, 2008, 8 pgs.

Kheradiya, et al., "Active Speaker Detection Using Audio-Visual Sensor Array", International Symposium on Signal Processing and Information Technology, IEEE, Dec. 15, 2014, 5 pgs.

Li, et al., "Multiple Active Speaker Localization based on Audio-visual Fusion in two Stages", Multisensor Fusion and Integration for Intelligent Systems, IEEE, Sep. 13, 2012, 7 pgs.

* cited by examiner

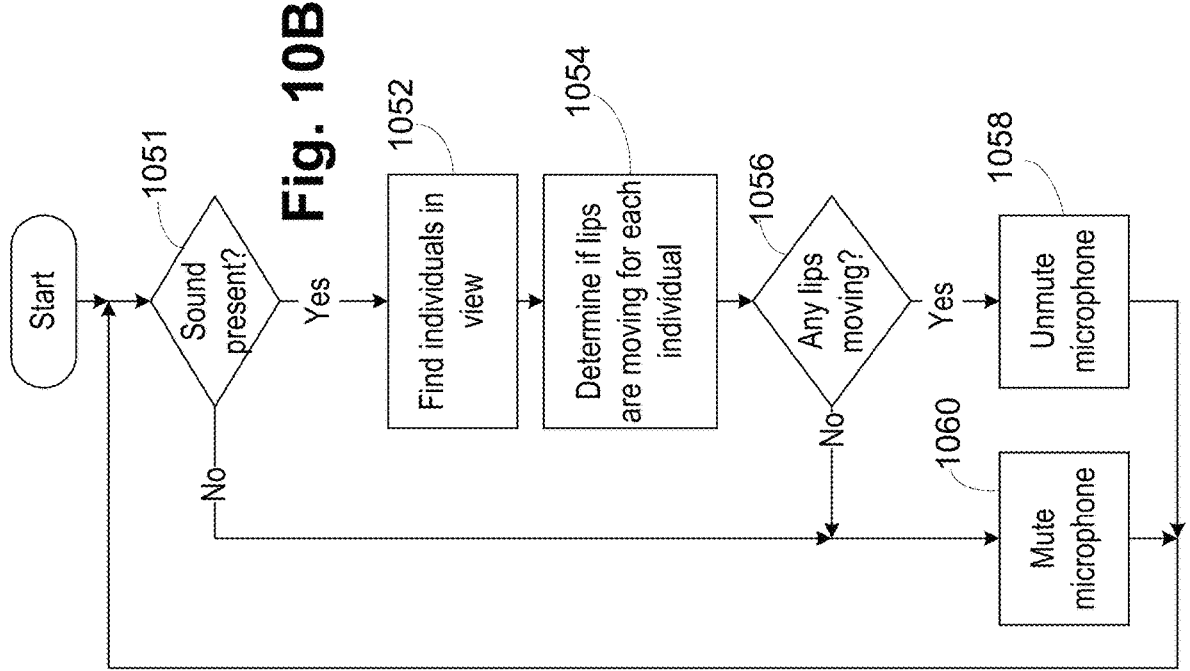
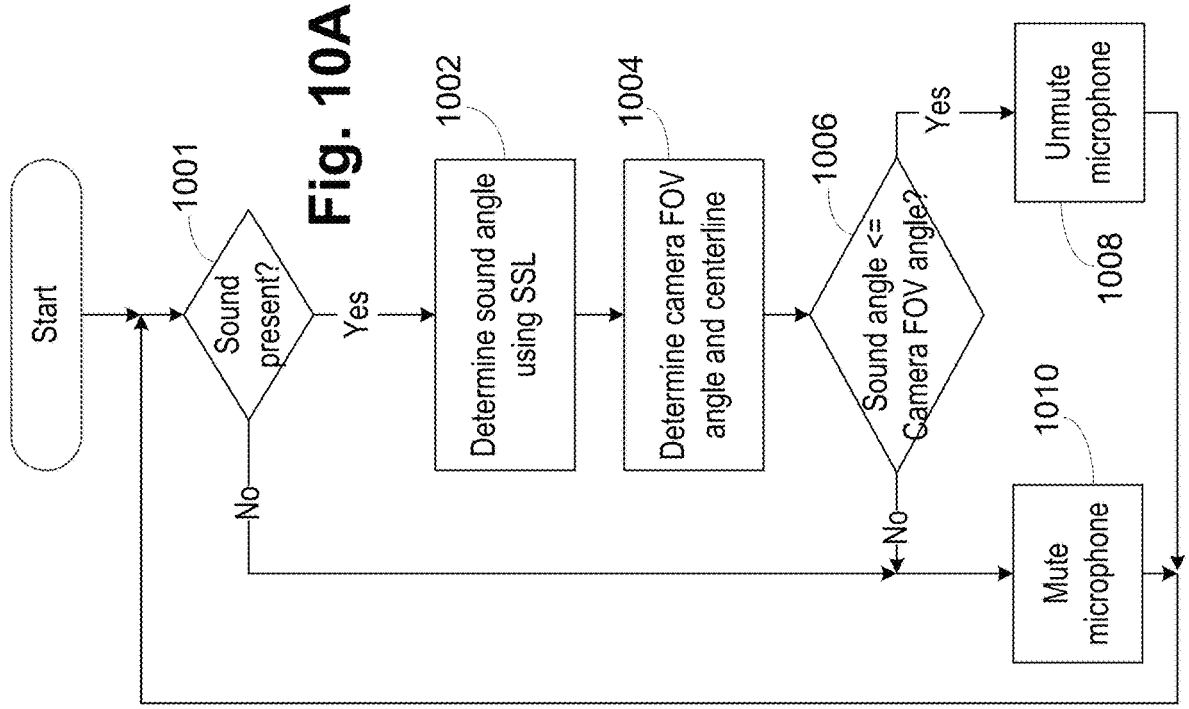

CAMERA-VIEW ACOUSTIC FENCE

TECHNICAL FIELD

This disclosure relates generally to muting and unmuting of audio in a videoconference.

BACKGROUND

One ongoing problem in videoconferencing is the intrusion of external noise sources, be it environmental noise or other individuals. Various techniques have been tried to provide what is called an acoustic fence around the videoconference area, with varying degrees of success. In some of the variations, a plurality of microphones are arranged in the form of a perimeter and used to detect background or far field noise which can be subtracted or used to mute or unmute the primary microphone audio. While this technique is acceptable and provides noise reduction in many cases, it requires multiple microphones located in various places and it is difficult for the individual to determine if he is inside or outside of the perimeter of the acoustically fenced area.

In another variation, an acoustic fence is set to be within a given angle of the centerline or on axis angle of the sensing microphone array. If the microphone array is located in the camera body, the centerlines of the camera and the microphone array angles can be matched. This results in an acoustic fence occurring for areas outside of the given angle of the array centerline, which is a given angle relating to the camera field-of-view. The desired capture angle of the sound source localization can be varied manually but that is difficult and tedious to do and still does not provide the user a better idea of whether the individual is inside or outside of the fence. As the time required to set the boundaries of the acoustic fence is reasonably long, it does not work properly with cameras that can be rapidly zoomed and/or panned to frame speakers, either mechanically or electrically. This results in noise from outside the camera angle field-of-view entering into the videoconference.

SUMMARY

In examples according to the present invention, the angle of sound relative to the centerline of the microphone array is determined. The angle of the centerline of the camera field-of-view and the angle of the camera field-of-view is also determined. As the apex of the centerlines of the microphone array and the camera are known, knowing the angle from the centerline of the microphone array of the particular sound and then the angle of the centerline of the camera field-of-view and angles of the camera field-of-view allows it to be determined if the sound originates inside the field-of-view of the camera. If so, the microphones that capture the sound for transmission to the far end are not muted, capturing the sound present in the field-of-view of the camera. If the angle of the sound is outside of the field-of-view of the camera, the microphones are muted so that noise extraneous to the field-of-view of the camera is not provided into the videoconference. As the camera zooms or pans, the changes in camera field-of-view and centerline angle are computed and used with the sound angle, so that the muting and unmuting occurs automatically as the camera zoom and pan angle change, alleviating the need for user control of the sound source localization capture angles of detection.

Other examples according to the present invention analyze the images recorded by the camera to find individuals and then determine if the lips of any of the found individuals are moving. If moving lips are found, then the microphone is unmuted. If no moving lips are found, the microphone is muted.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIG. 10A is a flowchart of operation of a videoconferencing system according to an example of this disclosure utilizing sound source localization and camera angle and field of view to determine the muted state of the primary microphone.

FIG. 10B is a flowchart of operation of a videoconferencing system according to an example of this disclosure utilizing face detection and lip movement detection to determine the muted state of the primary microphone.

DETAILED DESCRIPTION

Figure 1:
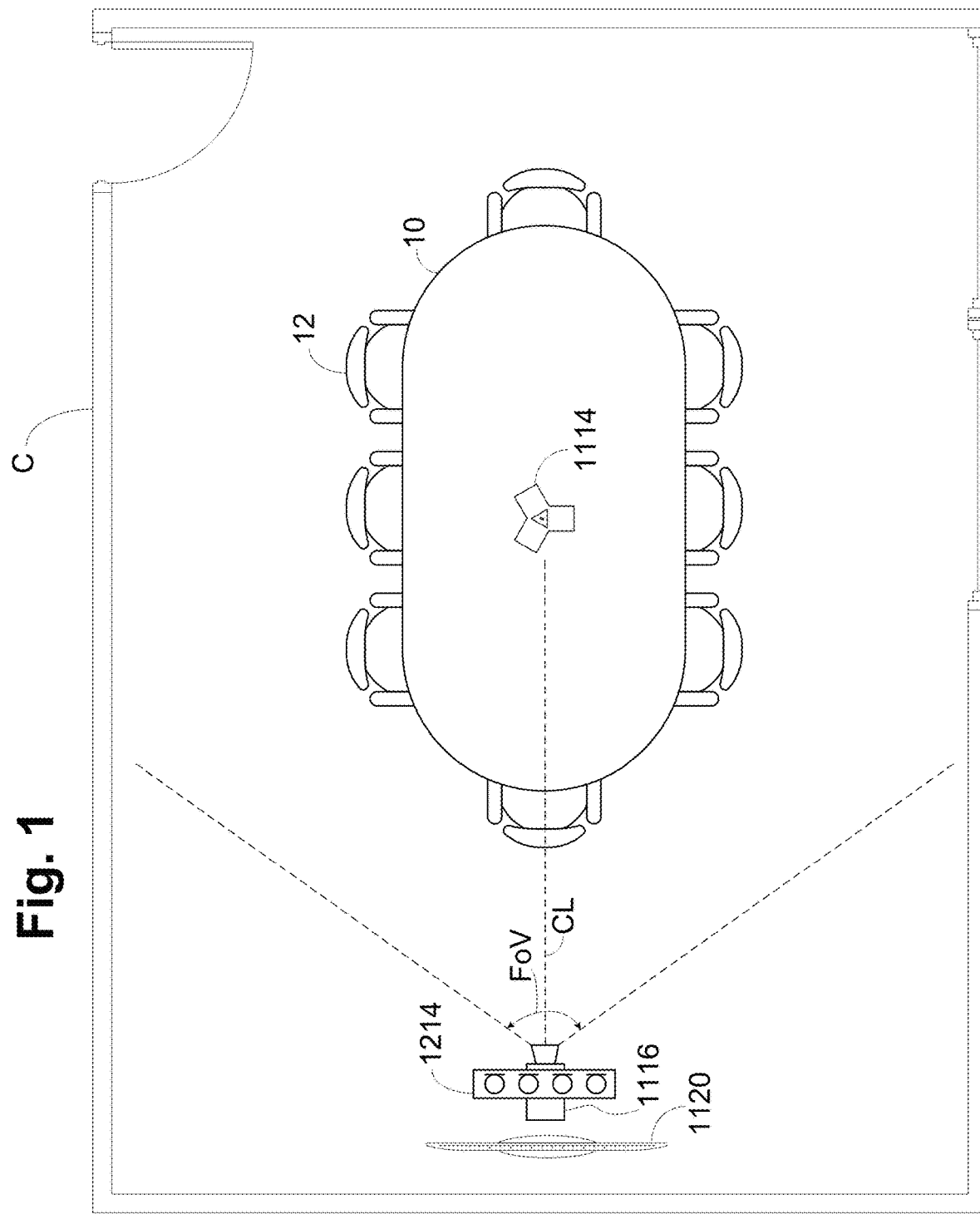
FIG. 1 is an illustration of a conference room containing a camera with a microphone array, a tabletop microphone, a monitor and table and chairs.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

Referring now to FIG. 1, a conference room C configured for use in videoconferencing is illustrated. Conference room C includes a conference table 10 and a series of chairs 12. A cameras 1116 is provided in the conference room C to view individuals seated in the various chairs 12. A monitor or television 1120 is provided to display the far end conference site or sites and generally to provide the loudspeaker output. The camera 1116 has a field-of-view (FoV) and an axis or centerline (CL). The camera 1116 includes a microphone array 1214 used for sound source localization (SSL). In the layout of FIG. 1, the camera 1116 is positioned such that the camera 1116 has its CL centered on the length of the conference table 10. A central microphone 1114 is provided to capture the speaker for transmission to the far end of the videoconference.

Figure 2:
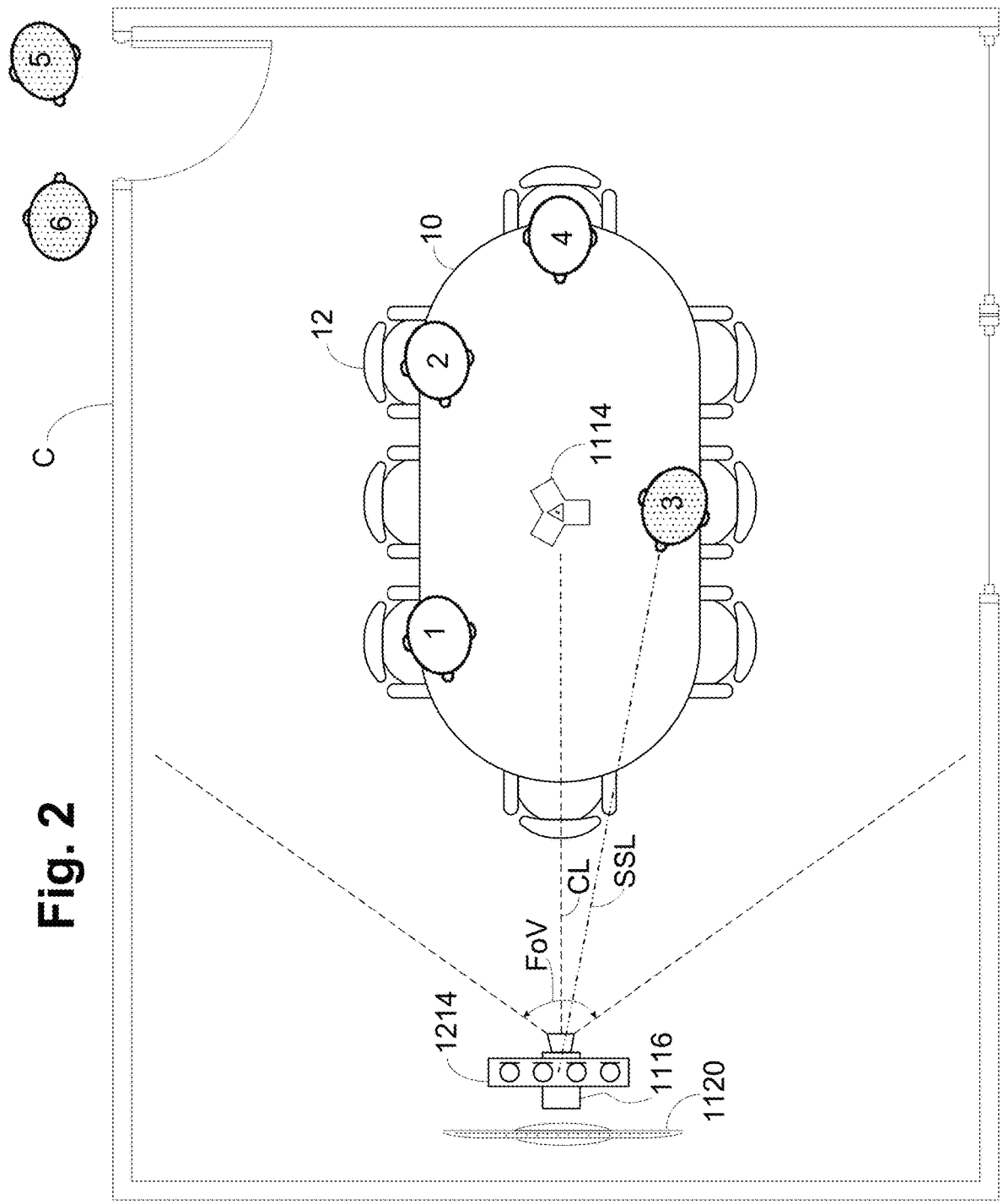
FIGS. 2-8 are illustrations of the conference room of FIG. 1 with various camera centerline angles and fields of view and various individuals, with zero, one or two individuals speaking.

Turning now to FIG. 2, four individuals 1, 2, 3, and 4 are seated in various of the chairs 12 and two individuals 5 and 6 are standing outside the door of the conference room C. Individual 3 in the conference room C is speaking, as indicated by the shading of individual 3. The SSL angle, the angle from the centerline of the microphone array, to individual 3 is indicated by SSL on the illustration. Individuals 5 and 6 are also speaking. The FoV of the camera 1116 is a wider angle, so that the entire conference room C is captured. If the microphone 1114 is unmuted, the speech of individual 3 will be detected, but so will the conversation of individuals 5 and 6, though at a lower level. If individuals 1, 2 or 4 started speaking, their speech would also be detected by the microphone 1114. This is appropriate as all of individuals 1-4 are in the FoV of the camera 1116, so that individuals at a far site would see the speaking individual.

Figure 3:
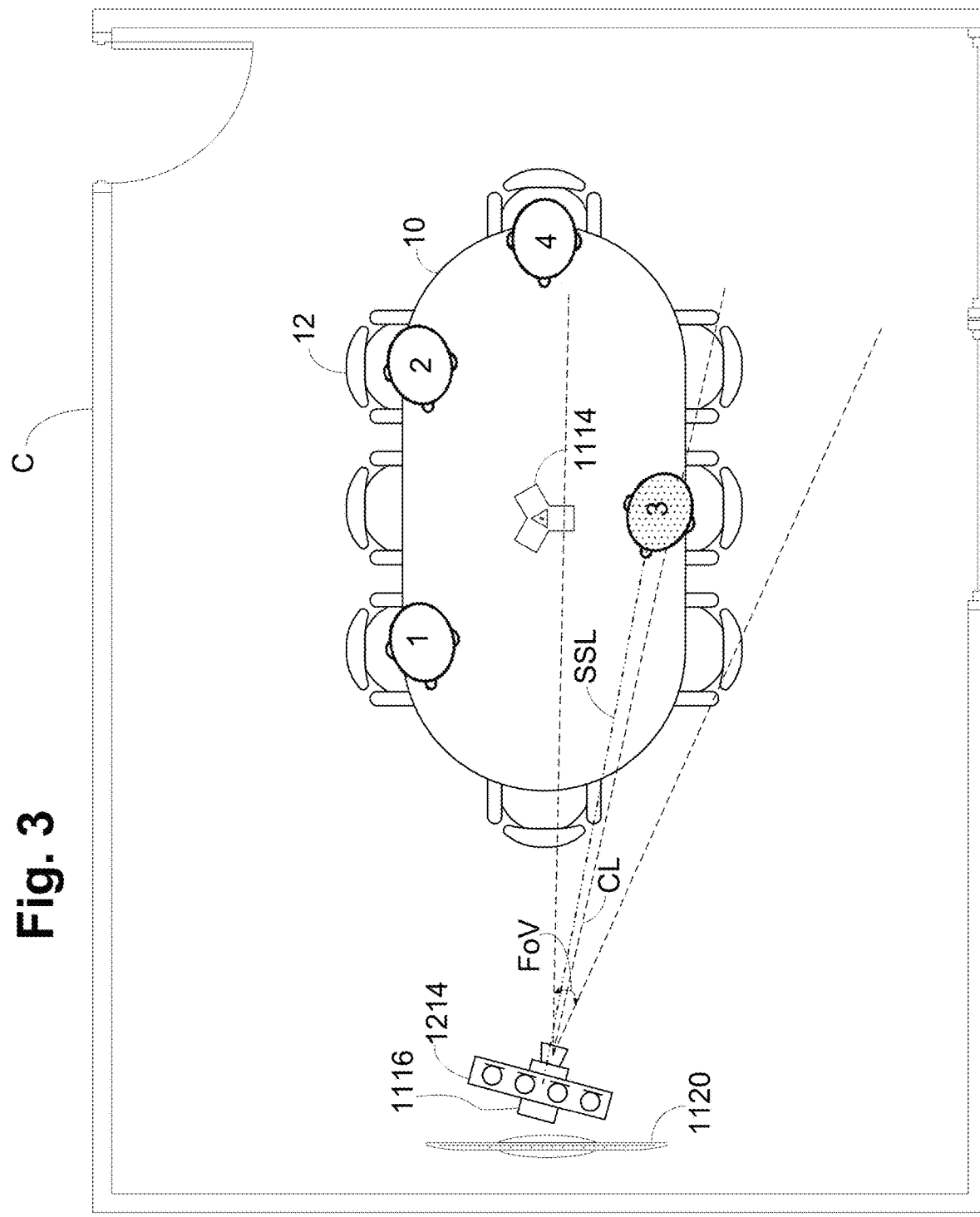

In FIG. 3, the FoV of the camera 1116 has been narrowed and the centerline angle changed, as the camera 1116 has been zoomed in on individual 3. This would occur if a user manually operated the camera 1116 or if the camera 1116 was performing automatic framing as described in U.S. Pat. No. 11,076,127, Ser. No. 16/949,081, which is hereby incorporated by reference. As individual 3 is still speaking and the SSL angle is within the camera FoV, the far site is still seeing the speaking individual.

Figure 4:
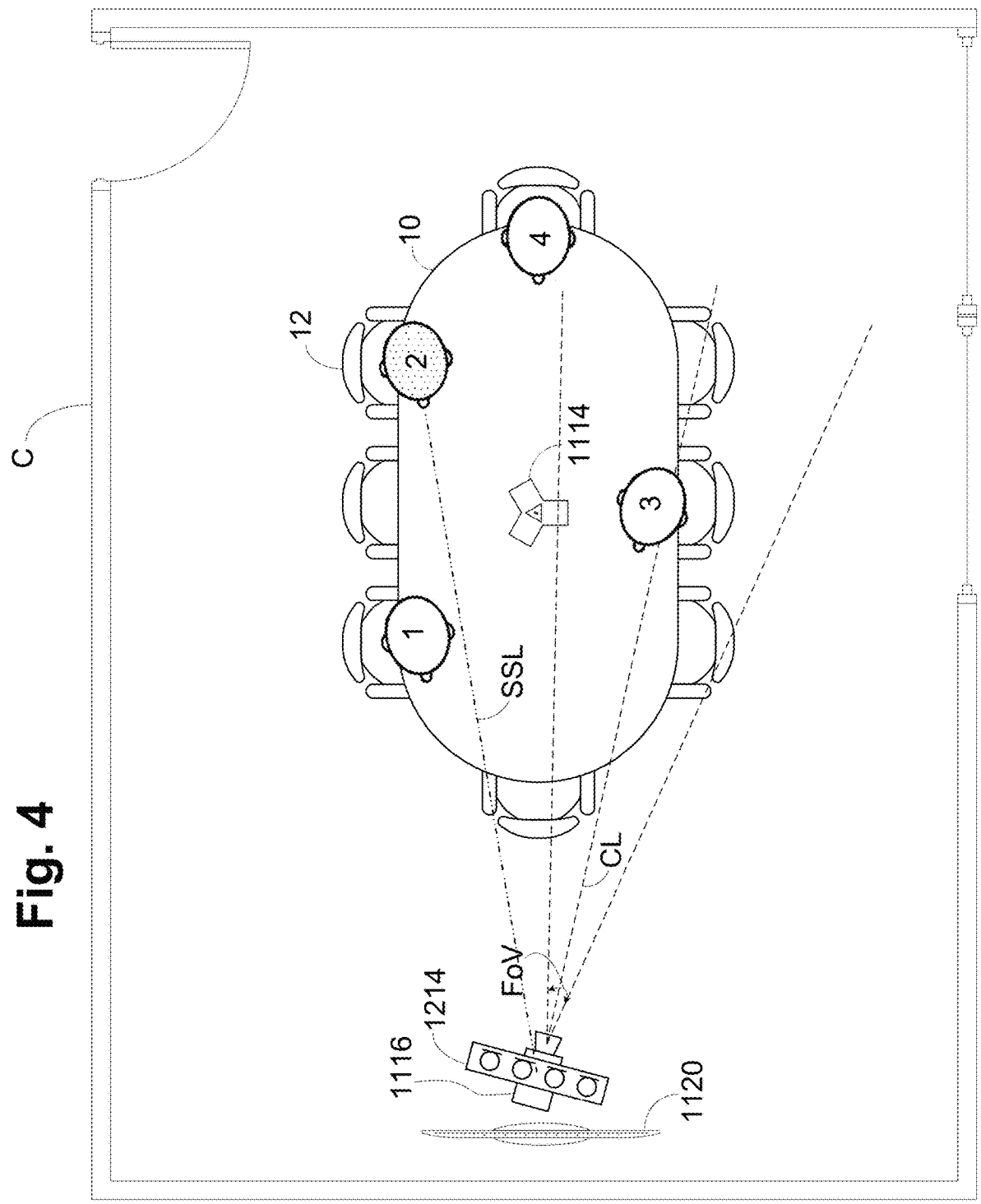

In FIG. 4, individual 2 is now speaking but the camera 1116 is still zoomed on individual 3. This situation could occur with automatic framing while the framing delays are in effect. In examples according to the present invention, the microphone 1114 is now muted, as the speaking individual is no longer in the FoV of the camera 1116, as the SSL angle is outside the camera FoV. If the microphone 1114 were to be unmuted, then the far site would receive disembodied speech or sound, speech or sound coming from off camera. As this is a disorienting experience for the far site, the microphone 1114 is muted.

Figure 5:
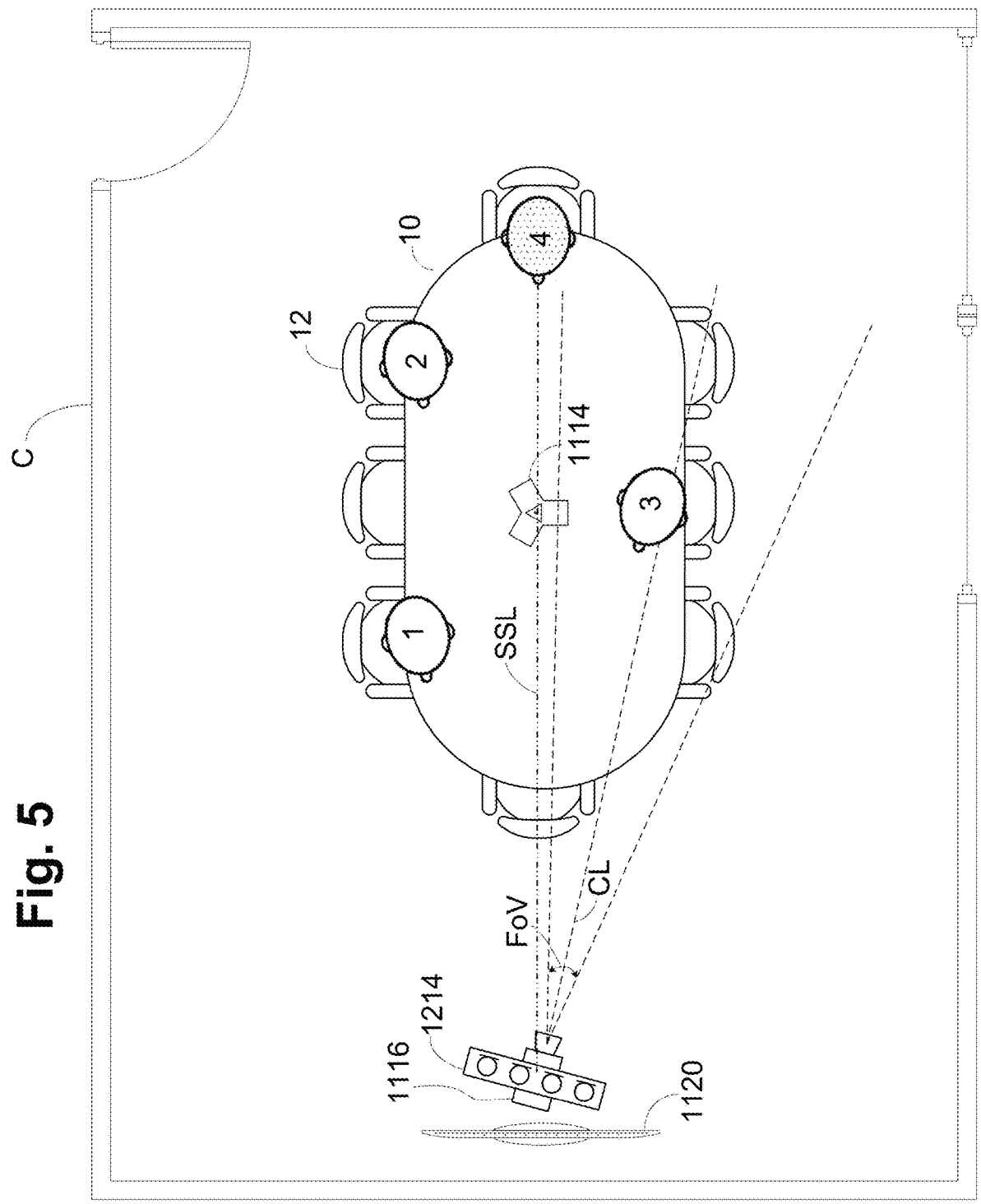

In FIG. 5, individual 4 is now speaking but the camera 1116 is still focused on individual 3, for example if the framing delays are still in effect. As individual 4 is just outside the edge of the FoV of the camera 1116 as shown by the SSL angle, the microphone 1114 remains muted.

Figure 6:
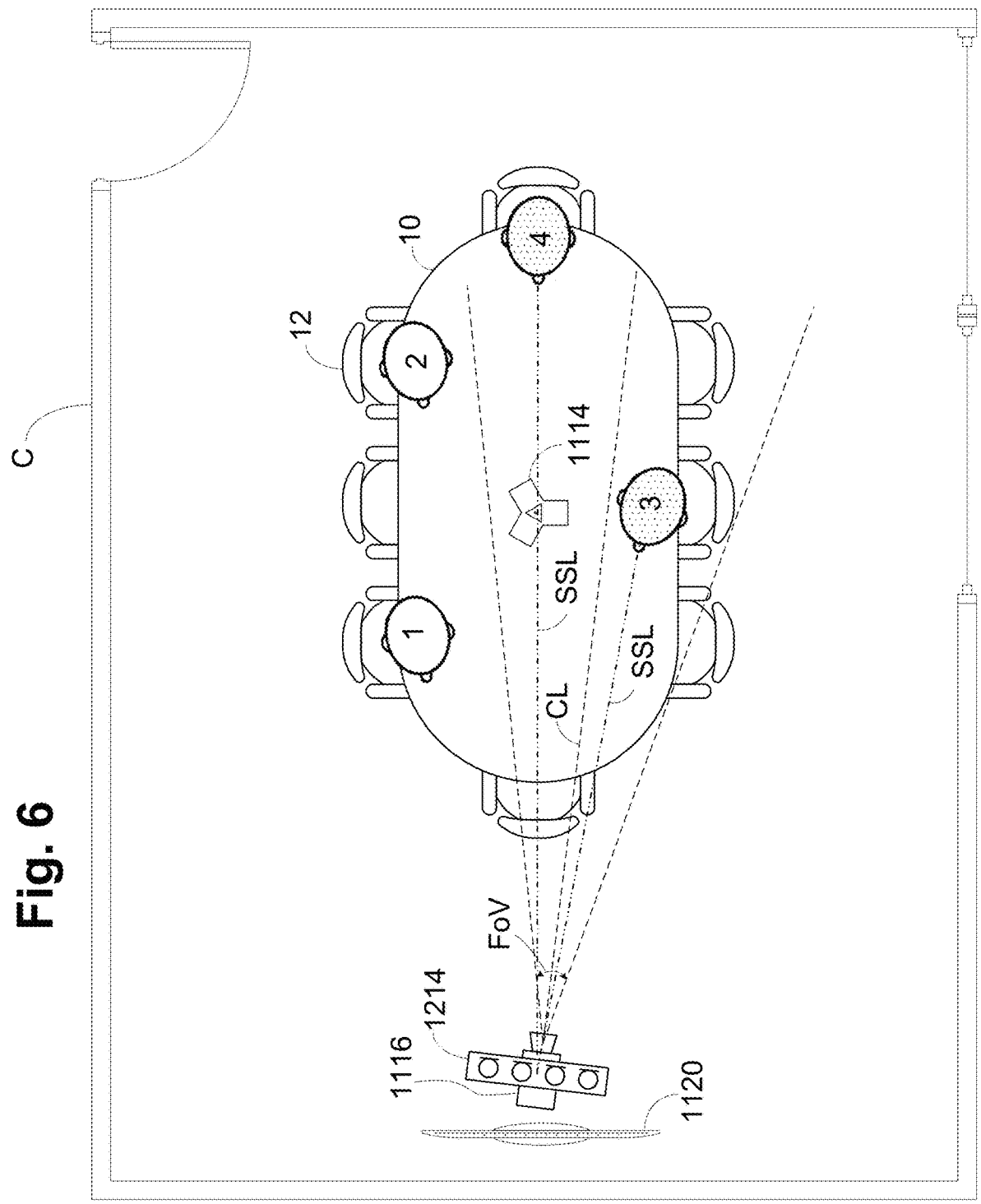

In FIG. 6, individuals 3 and 4 are speaking and the FoV of the camera 1116 has widened and the centerline rotated closer to individual 4 based on a framing change to conversation mode where multiple speakers are framed. SSL angles are shown for both individual 3 and individual 4. The rotation and widening of the FoV results in both individuals 3 and 4 being inside the FoV, so that again the far site is hearing the speaking individuals as the microphone 1114 is unmuted.

Figure 7:
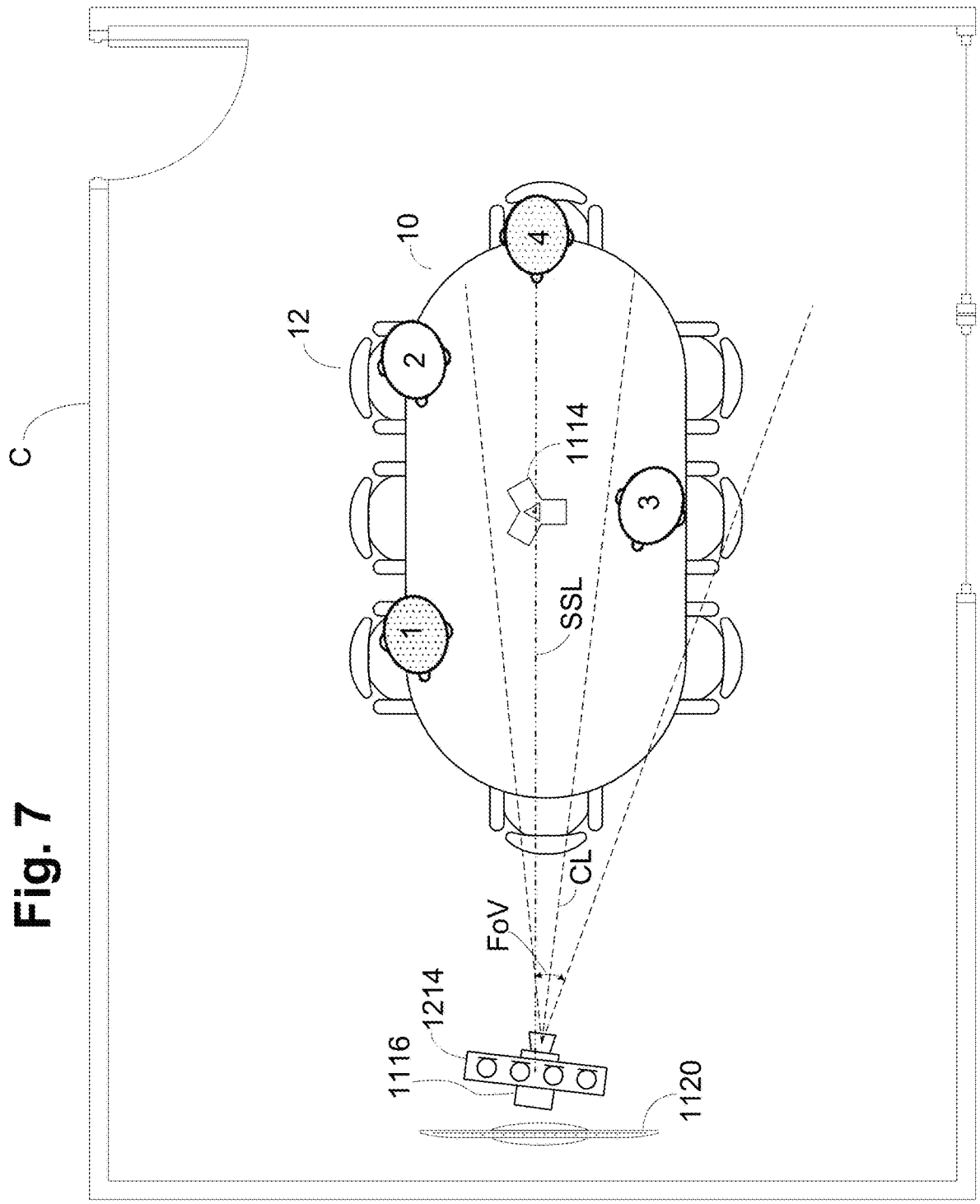

In FIG. 7, individual 3 has stopped talking but individual 1 has started talking, along with individual 4. The camera 1116 is still framing individuals 3 and 4, so that the far site can see one of the talking individuals but not the other. The microphone 1114 is unmuted as an individual in the FoV is speaking.

Figure 8:
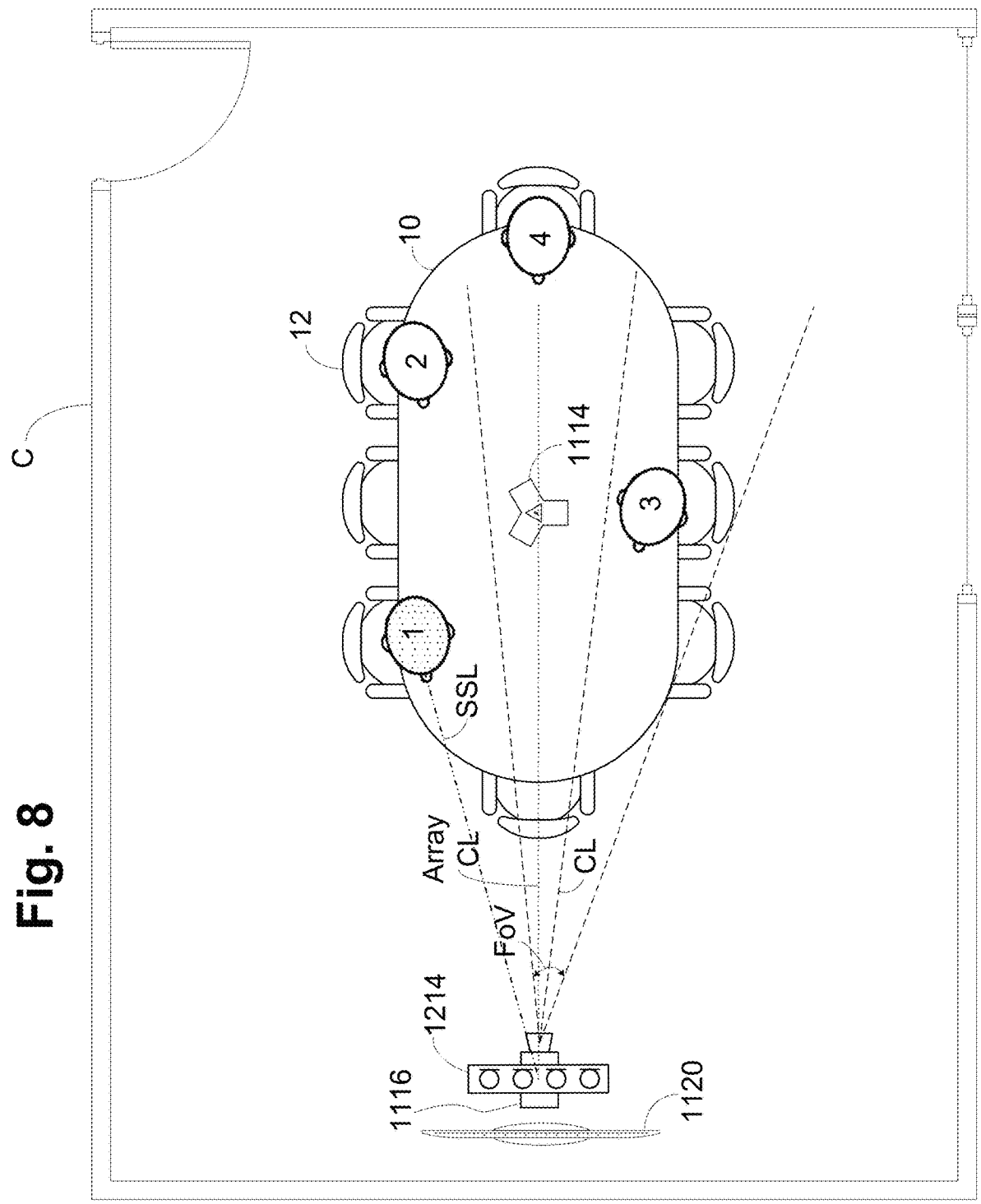

In FIG. 8, individual 4 has stopped talking, with only individual 1 speaking. The camera 1116 is still framing individuals 3 and 4, but microphone 1114 is muted, as no speaking individuals are present in the FoV of the camera 1116, as shown by the SSL angle being outside of the camera FoV. The camera 1116 will frame individual 1 when the appropriate time has completed. When the camera 1116 is framing individual 1, the microphone 1114 is unmuted as once again the speaking individual is in the FoV of the camera 1116.

In FIGS. 3-7, the camera 1116 and the microphone array 1214 are shown rotated from the original centerline, as the camera 1116 has mechanically panned and zoomed, with the axes of rotation of the camera 1116 and the microphone array 1214 being the same. As the microphone array is part of the camera 1116, the microphone array 1214 has also panned. This allows the centerlines of the camera 1116 and the microphone array 1214 to remain identical, simplifying calculations. In FIG. 8, the camera 1116 and the microphone array 1214 remain in their original position, the camera 1116 axis parallel to the axis of the conference table 10 and the microphone array 1214 perpendicular to the axis of the conference table 10. However, the camera centerline CL and FoV have rotated while the physical camera does not pan. This is an example of zooming and panning in an electronic pan, tilt, zoom (FPTZ) camera. The microphone array 1214 centerline Array CL is shown parallel to the axis of the conference table 10 but the centerline CL of the camera 1116 is rotated. The angular difference in the Array CL and camera CL is determined and used to adjust the angles compared when determining if the sound is in the camera FoV.

Figure 9:
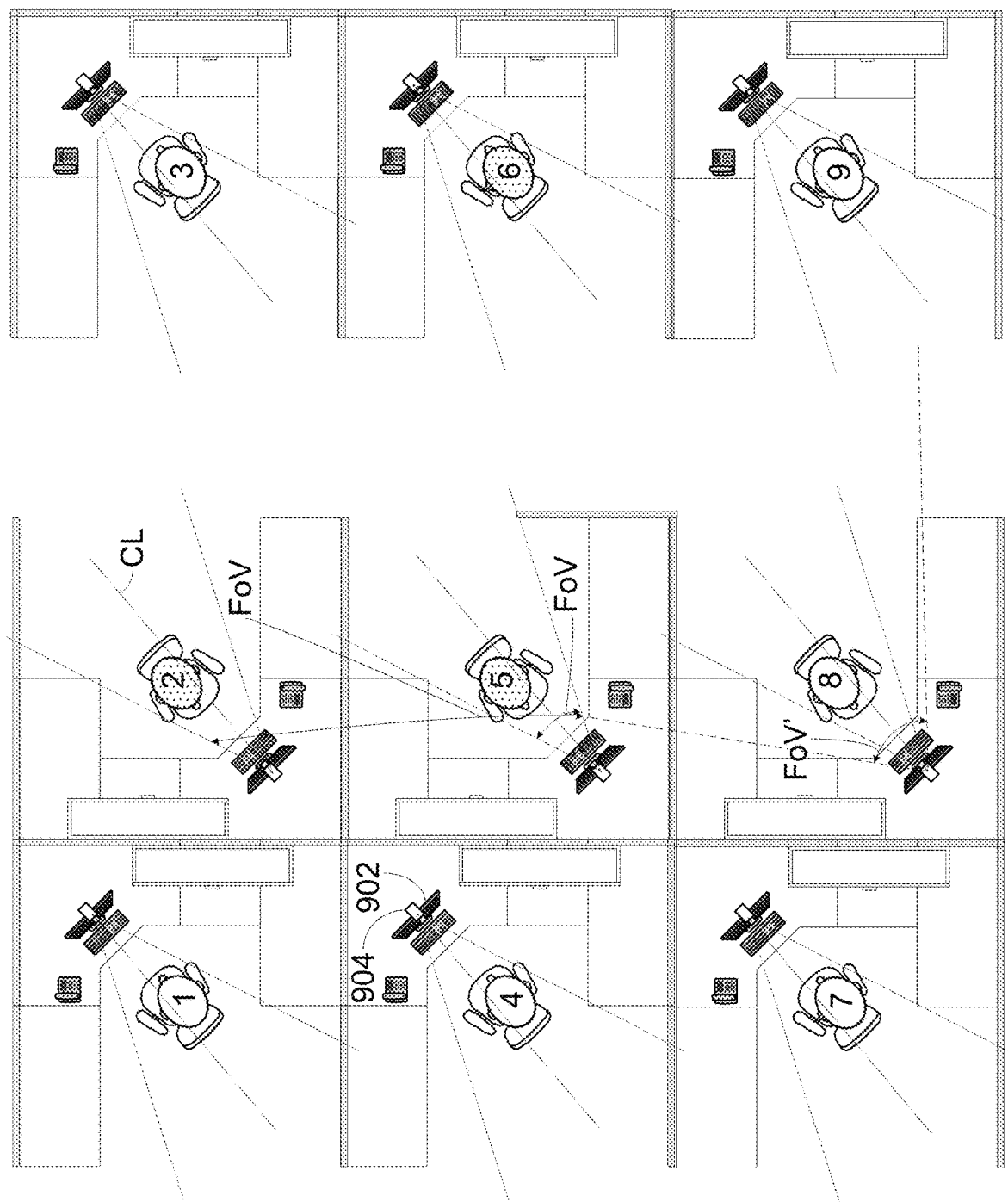
FIG. 9 is an illustration of an office area formed by a series of cubicles, each cubicle having an individual and the camera and microphone for use in a videoconference.

FIG. 9 illustrates examples operating in a cubicle environment. Each cubicle includes a monitor 902 and a camera 904, the camera 904 including a microphone array to allow SSL operation. The examples presume that the focus, the FoV and centerline, of the camera 904 are operated manually. Individuals 2, 5 and 6 are speaking, so their respective microphones, which may be microphones in the microphone array, are unmuted, with the remainder of the microphones muted. For example, individual 8 is not speaking, so that microphone is muted. If the camera 904 FoV is widened to the indicated FoV' for individual 8, then individual 5 is within the FoV of the camera 904, so the microphone of individual 8 would be unmuted, as individual 5 is speaking. This is undesirable, so the FoV of the camera 904 is better focused just on individual 8, so that the microphone is muted when individual 8 is not speaking. This provides a quieter videoconference for the far site, as only when individual 8 is speaking is the microphone unmuted.

FIG. 10A is a flowchart of operation using SSL to determine if the source of sound is in the FoV of the camera. In step 1001, it is determined if sound is present in the output of the microphone. If not, operation proceeds to step 1010 to mute the microphone; then operation returns to step 1001. If sound is present, in step 1002 SSL is used to determine the angle of the sound from the centerline of the microphone array by analyzing the audio output signals of the microphone array 1214, which centerline is preferably aligned parallel with a line normal to the center of the camera lens. SSL can be performed as disclosed in U.S. Pat. No. 6,912,178, which is hereby incorporated by reference, or by other desired methods. In step 1004, the FoV angle and centerline angle of the camera are determined. If the camera performs physical pan, tilt and zoom (PTZ), the centerline angle and FoV are determined based on the pan angle and the zoom amount. If the camera performs electronic PTZ (EPTZ), the centerline angle is determined by the number of pixels the center of the image or frame is displaced from the center of the camera full image and the number of pixels in the full width of the camera. The FoV is determined by the ratio of the width of the image to the width of the full image and applying that ratio to the FoV if the camera. In step 1006, the sound angle as determined from the SSL is checked against the FoV range of the camera image, based on the centerline angle and camera FoV. If the centerline of the microphone array and the camera are aligned, this is a simple comparison. If the two centerlines are not aligned, as would be the case in an EPTZ camera, the angle between the two centerlines is determined and used to adjust the determined angle of the sound to be based on the camera centerline. If the sound angle is within the FoV of the camera so that the sound originates within the FoV of the camera, in step 1008 the microphone is unmuted. If the sound angle is not within the FoV of the camera, in step 1010 the microphone is muted. Operation returns to step 1001 so that the muting and unmuting are automatic as the panning and zooming of the camera 1116 is performed.

In the above description the microphone is unmuted if sound is found originating in the camera FoV. In some examples a further step is included to determine if the sound is speech before unmuting the microphone. This keeps the microphone muted for just noise sources, such as fans or other environmental noise, when there is no speech.

FIG. 10B is a flowchart based on determining if a speaker is in the FoV of the camera by determining if any individuals in the FoV are moving their lips. In step 1051, it is determined if sound is present in the output of the microphone. If not, operation proceeds to step 1060 to mute the microphone and then operation returns to step 1051. If sound is present, in step 1052, the individuals in the FoV are detected. This detection can be done in many ways but use of a neural network is one common way. In step 1054, the image of each individual is further analyzed to determine if the individual's lips are moving. Again, there are many ways to perform this analysis, but use of a neural network is a common way. In step 1056 it is determined if any individual's lips are moving. If so, in step 1058 the microphone is unmuted. If no lips are moving, in step 1060 the microphone is muted. Operation returns to step 1051 for automatic operation.

While this approach appears more direct, it is computationally more intensive, requiring determining if lips are moving. Further, if the individual is not facing the camera, lip movement may not be visible to be detected, even though sound is being detected by the microphone. In such cases or if computing resources are limited, the SSL method of FIG. 10A is utilized.

Figure 11:
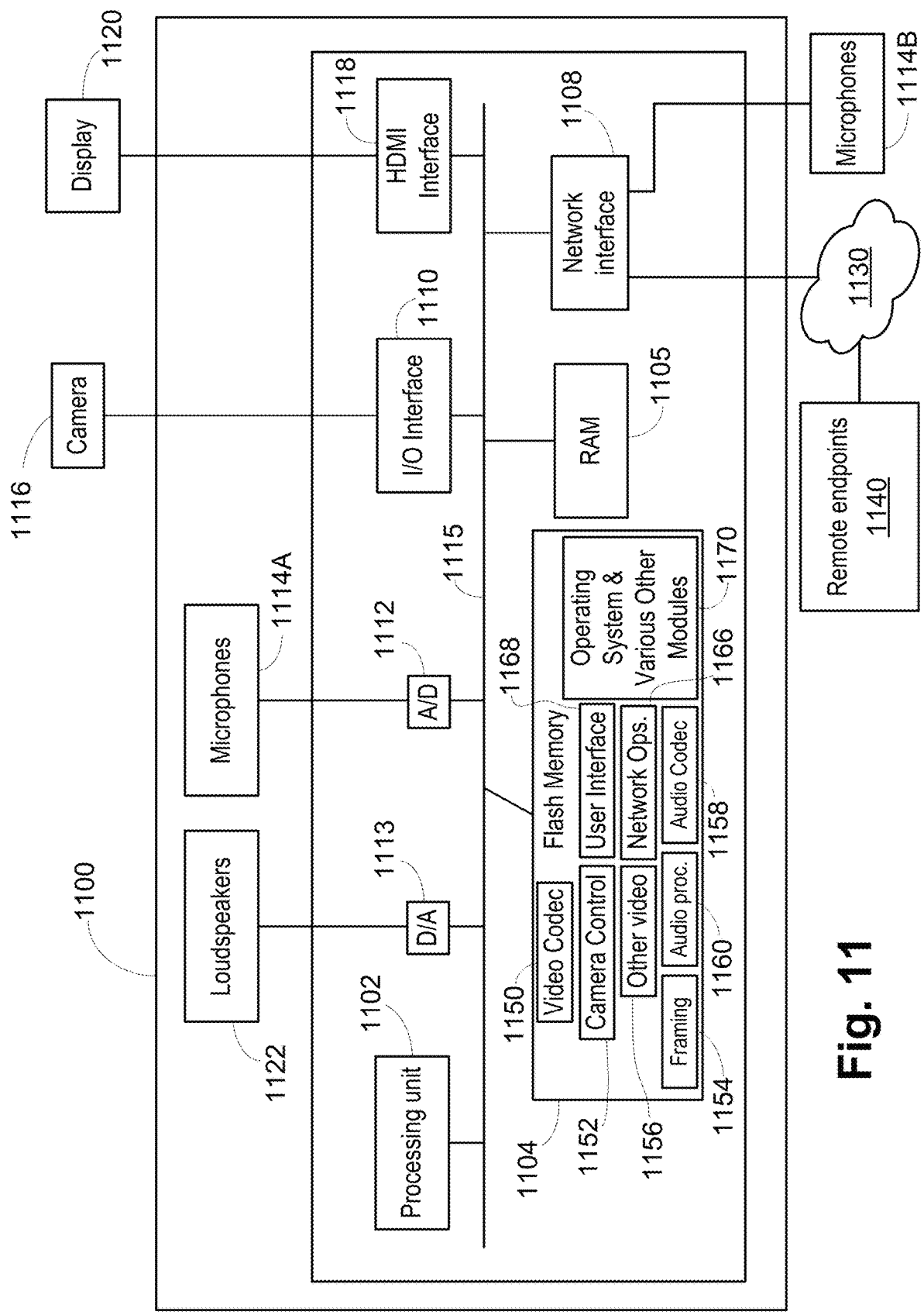
FIG. 11 is a block diagram of a codec according to an example of this disclosure.

FIG. 11 illustrates aspects of a codec 1100 in accordance with an example of this disclosure. The codec 1100 may include loudspeaker(s) 1122, though in many cases the loudspeaker 1122 is provided in the monitor 1120, and microphone(s) 1114A interfaced via interfaces to a bus 1115, the microphones 1114A through an analog to digital (A/D) converter 1112 and the loudspeaker 1122 through a digital to analog (D/A) converter 1113. The codec 1100 also includes a processing unit 1102, a network interface 1108, a flash or other non-transitory memory 1104, RAM 1105, and an input/output (I/O) general interface 1110, all coupled by bus 1115. The camera 1116 is illustrated as connected to the I/O interface 1110. Microphone(s) 1114B are connected to the network interface 1108. An HDMI interface 1118 is connected to the bus 1115 and to the external display or monitor 1120. Bus 1115 is illustrative and any interconnect between the elements can used, such as Peripheral Component Interconnect Express (PCIe) links and switches, Universal Serial Bus (USB) links and hubs, and combinations thereof. The camera 1116 and microphones 1114A, 1114B can be contained in housings containing the other components or can be external and removable, connected by wired or wireless connections.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, generically programs, for controlling the codec 1100. Illustrated modules include a video codec 1150, camera control 1152, framing 1154, other video processing 1156, audio codec 1158, audio processing 1160, network operations 1166, user interface 1168 and operating system and various other modules 1170. At least some of the operations of FIG. 10A are performed in the audio processing 1160. The muting and unmuting operations of FIG. 10B are performed in the audio processing 1160. The RAM 1105 is used for storing any of the modules in the flash memory 1104 when the module is executing, storing video images of video streams and audio samples of audio streams and can be used for scratchpad operation of the processing unit 1102.

The network interface 1108 enables communications between the codec 1100 and other devices and can be wired, wireless or a combination. In one example, the network interface 1108 is connected or coupled to the Internet 1130 to communicate with remote endpoints 1140 in a videoconference. In one or more examples, the general interface 1110 provides data transmission with local devices such as a keyboard, mouse, printer, projector, display, external loudspeakers, additional cameras, and microphone pods, etc.

In one example, the camera 1116 and the microphones 1114 capture video and audio, respectively, in the videoconference environment and produce video and audio streams or signals transmitted through the bus 115 to the processing unit 1102. In at least one example of this disclosure, the processing unit 1102 processes the video and audio using algorithms in the modules stored in the flash memory 1104. Processed audio and video streams can be sent to and received from remote devices coupled to network interface 1108 and devices coupled to general interface 1110. This is just one example of the configuration of a codec 1100.

Figure 12:
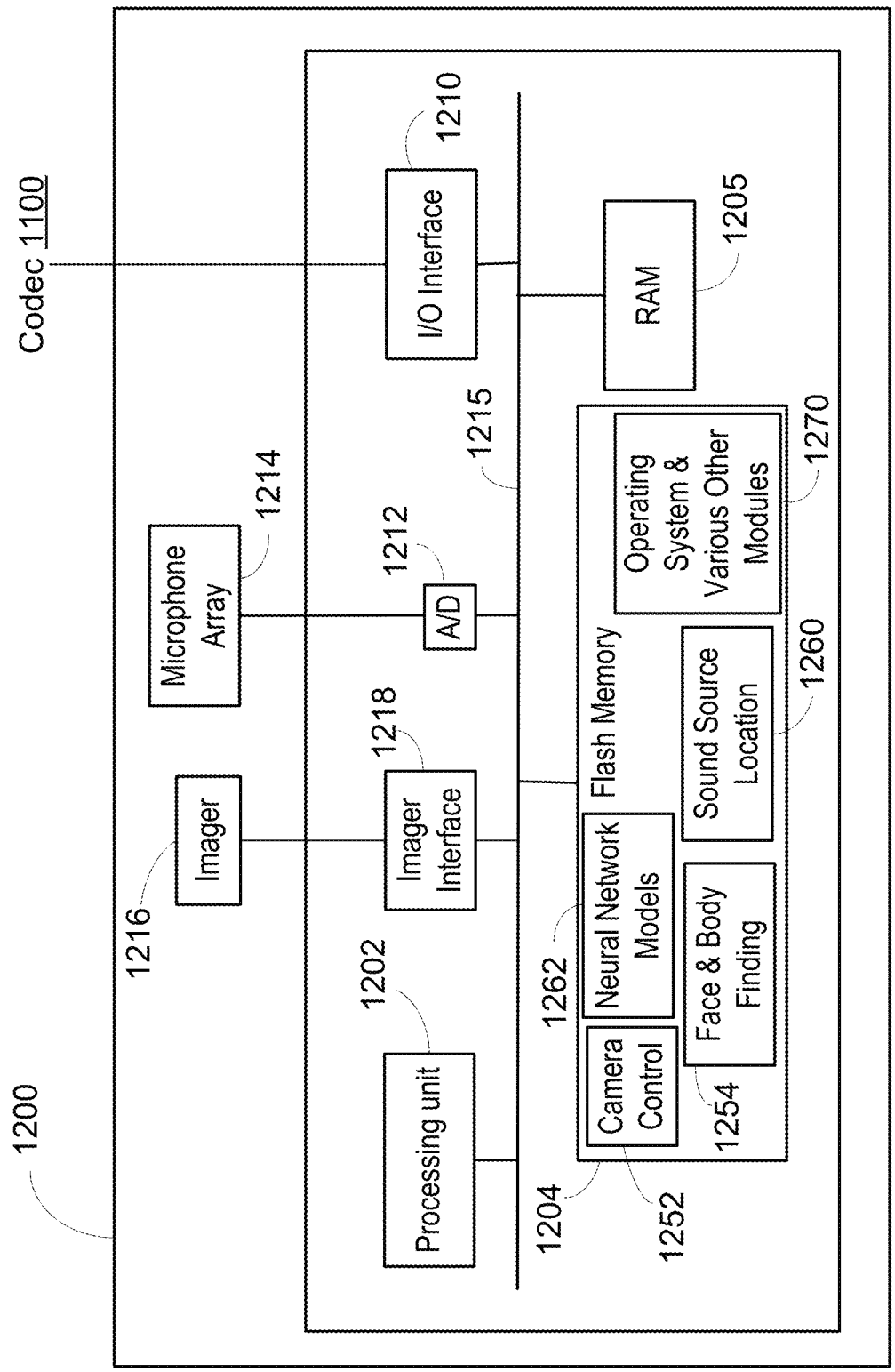
FIG. 12 is a block diagram of a camera according to an example of this disclosure.

FIG. 12 illustrates aspects of a camera 1200, such as camera 1116, in accordance with an example of this disclosure. The camera 1200 includes an imager or sensor 1216 and a microphone array 1214 interfaced via interfaces to a bus 1215, the microphone array 1214 audio output signals through an analog to digital (A/D) converter 1212 and the imager 1216 through an imager interface 1218. The camera 1200 also includes a processing unit 1202, a flash or other non-transitory memory 1204, RAM 1205, and an input/output general interface 1210, all coupled by bus 1215. Bus 1215 is illustrative and any interconnect between the elements can used, such as Peripheral Component Interconnect Express (PCIe) links and switches, Universal Serial Bus (USB) links and hubs, and combinations thereof. The codec 1100 is connected to the I/O interface 1210, preferably using a USB interface.

The processing unit 1202 can include digital signal processors (DSPs), central processing units (CPUs), graphics processing units (GPUs), dedicated hardware elements, such as neural network accelerators and hardware codecs, and the like in any desired combination.

The flash memory 1204 stores modules of varying functionality in the form of software and firmware, generically programs, for controlling the camera 1200.

Illustrated modules include camera control 1252, face and body finding 1254, sound source localization 1260, neural network models 1262 and operating system and various other modules 1270. The SSL 1260 output is used by the audio processing 1160 for the operation of FIG. 10A. The face and body finding 1254 can include the lip detection of FIG. 10B. The RAM 1205 is used for storing any of the modules in the flash memory 1204 when the module is executing, storing video images of video streams and audio samples of audio streams and can be used for scratchpad operation of the processing unit 1202.

In a second configuration, the cameras are simplified and the codec capabilities and processing are increased. In this second configuration, the neural networks operate on the codec instead of the cameras. The cameras provide their raw video streams to the codec, which then are analyzed using neural networks to find the bounding boxes, pose estimations and keypoints developed by the cameras in the first configuration. In the second configuration the cameras still perform sound source localization and provide the location information to the codec. In a third configuration, the sound source localization is also performed by the codec, with the cameras providing the audio streams from each microphone. This third configuration allows for the simplest cameras, but at the expense of further increasing the processing requirements of the codec. The second configuration is a middle ground between the first and third configurations, requiring less processing from the codec but more processing in the cameras. The use of a particular configuration depends on component costs for the required performance levels.

Other configurations, with differing components and arrangement of components, are well known for both videoconferencing endpoints and for devices used in other manners.

Figure 13:
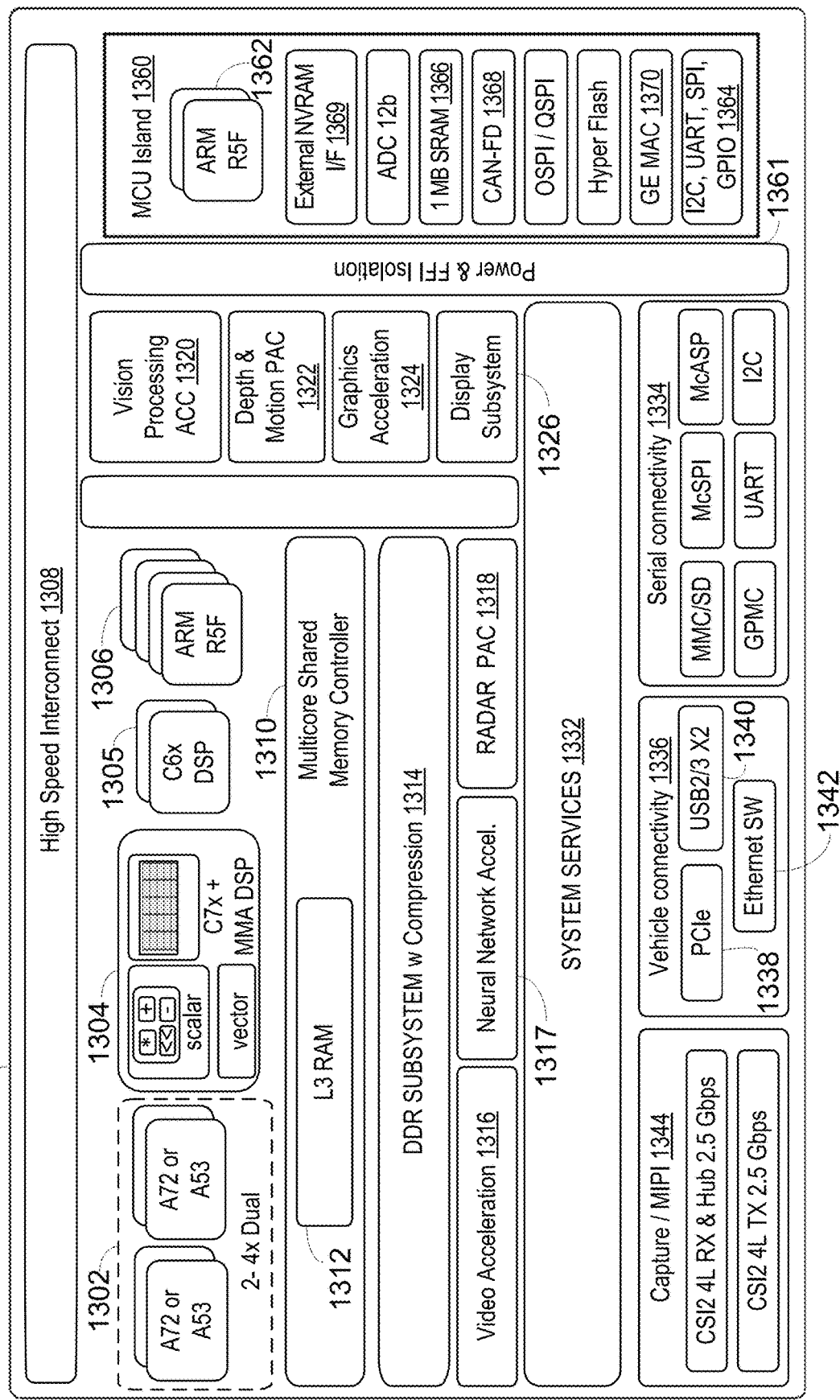
FIG. 13 is a block diagram of the processors of FIGS. 11 and 12.

FIG. 13 is a block diagram of an exemplary system on a chip (SoC) 1300 as can be used as the processing unit 1102 or 1202. A series of more powerful microprocessors 1302, such as ARM® A72 or A53 cores, form the primary general-purpose processing block of the SoC 1300, while a more powerful digital signal processor (DSP) 1304 and multiple less powerful DSPs 1305 provide specialized computing capabilities. A simpler processor 1306, such as ARM R5F cores, provides general control capability in the SoC 1300. The more powerful microprocessors 1302, more powerful DSP 1304, less powerful DSPs 1305 and simpler processor 1306 each include various data and instruction caches, such as L1I, L1D, and L2D, to improve speed of operations. A high-speed interconnect 1308 connects the microprocessors 1302, more powerful DSP 1304, simpler DSPs 1305 and processors 1306 to various other components in the SoC 1300. For example, a shared memory controller 1310, which includes onboard memory or SRAM 1312, is connected to the high-speed interconnect 1308 to act as the onboard SRAM for the SoC 1300. A DDR (double data rate) memory controller system 1314 is connected to the high-speed interconnect 1308 and acts as an external interface to external DRAM memory. The RAM 1105 or 1205 are formed by the SRAM 1312 and external DRAM memory. A video acceleration module 1316 and a radar processing accelerator (PAC) module 1318 are similarly connected to the high-speed interconnect 1308. A neural network acceleration module 1317 is provided for hardware acceleration of neural network operations. A vision processing accelerator (VPACC) module 1320 is connected to the high-speed interconnect 1308, as is a depth and motion PAC (DMPAC) module 1322.

A graphics acceleration module 1324 is connected to the high-speed interconnect 1308. A display subsystem 1326 is connected to the high-speed interconnect 1308 to allow operation with and connection to various video monitors. A system services block 1332, which includes items such as DMA controllers, memory management units, general-purpose I/O's, mailboxes and the like, is provided for normal SoC 1300 operation. A serial connectivity module 1334 is connected to the high-speed interconnect 1308 and includes modules as normal in an SoC. A vehicle connectivity module 1336 provides interconnects for external communication interfaces, such as PCIe block 1338, USB block 1340 and an Ethernet switch 1342. A capture/MIPI module 1344 includes a four-lane CSI-2 compliant transmit block 1346 and a four-lane CSI-2 receive module and hub.

An MCU island 1360 is provided as a secondary subsystem and handles operation of the integrated SoC 1300 when the other components are powered down to save energy. An MCU ARM processor 1362, such as one or more ARM R5F cores, operates as a master and is coupled to the high-speed interconnect 1308 through an isolation interface 1361. An MCU general purpose I/O (GPIO) block 1364 operates as a slave. MCU RAM 1366 is provided to act as local memory for the MCU ARM processor 1362. A CAN bus block 1368, an additional external communication interface, is connected to allow operation with a conventional CAN bus environment in a vehicle. An Ethernet MAC (media access control) block 1370 is provided for further connectivity. External memory, generally non-volatile memory (NVM), such as flash memory 1104 or 1204, is connected to the MCU ARM processor 1362 via an external memory interface 1369 to store instructions loaded into the various other memories for execution by the various appropriate processors. The MCU ARM processor 1362 operates as a safety processor, monitoring operations of the SoC 1300 to ensure proper operation of the SoC 1300.

It is understood that this is one example of an SoC provided for explanation and many other SoC examples are possible, with varying numbers of processors, DSPs, accelerators and the like.

Figure 14:
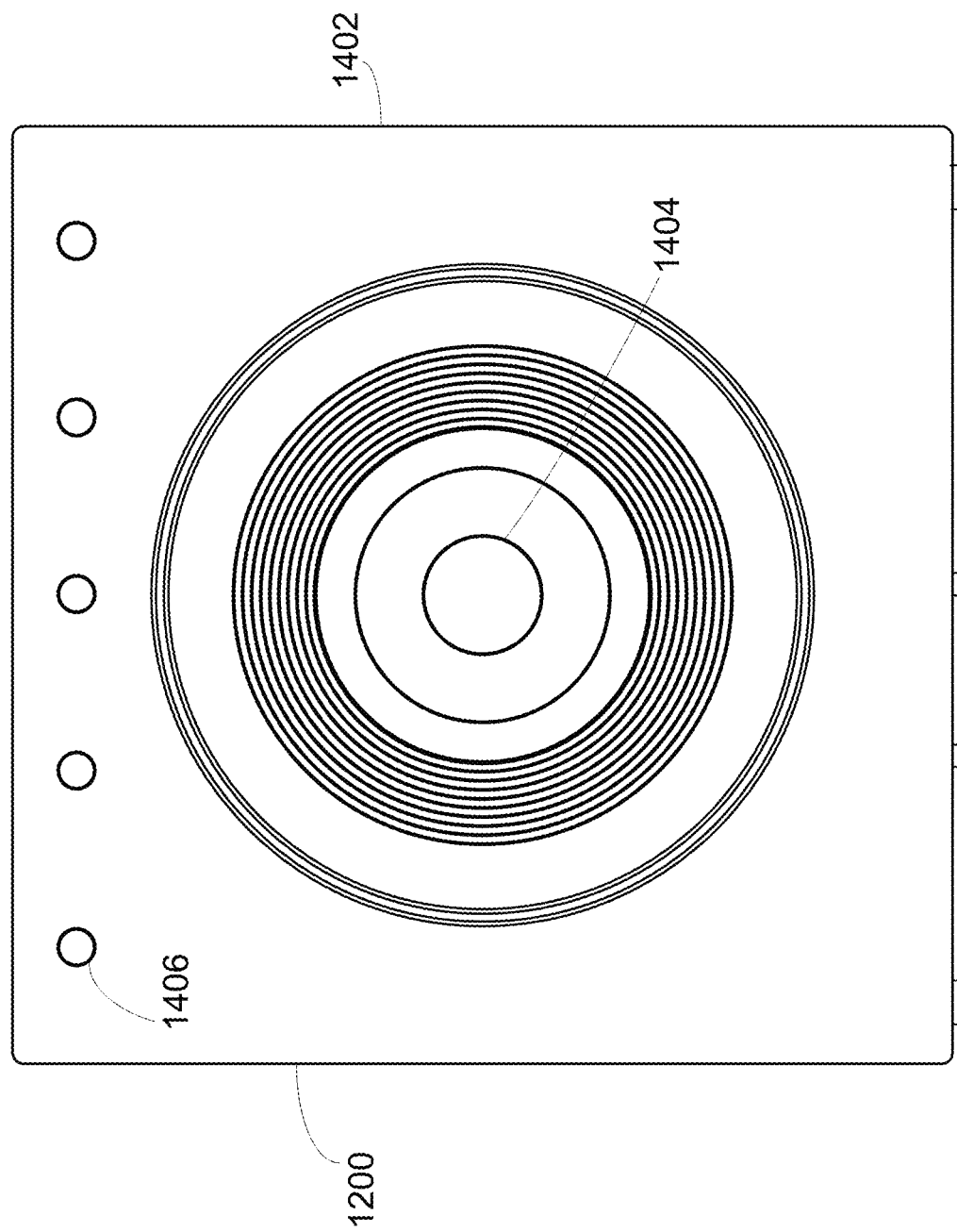
FIG. 14 is an illustration of the front view of a camera according to an example of this disclosure.

FIG. 14 provides an example of a front view of a camera 1200, such as the camera 1116. The camera 1200 has a housing 1402 with a lens 1404 provided in the center to operate with the imager 1216. A series of five openings 1406 are provided as ports to the microphones in the microphone array 1214. It is noted that the microphone openings 1406 form a horizontal line to provide the desired angular determination for the sound source localization algorithm. This is an exemplary illustration of a camera 1200 and numerous other configurations are possible, with varying lens and microphone configurations.

The above description assumed that the axes of camera 1116 and the microphone array 1214 were co-located. If the axes are displaced, the displacement is used in translating the determined sound angle from the microphone array to the camera frames of reference.

Microphones in the microphone array used for SSL can be used as the microphones providing speech to the far site or separate microphones, such as microphone 1114, can be used.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. A method for selecting audio to be transmitted in a videoconference,
the method comprising:
reviewing, by a processing unit, an output of a microphone for sound;
providing, by the processing unit from a camera having a field-of-view (FoV), an image from the camera;
determining, by the processing unit, whether or not the sound originates from within the FoV of the camera;
muting, by the processor, the microphone when the processing unit determines that the sound does not originate from within the FoV of the camera; and
unmuting, by the processor, the microphone when the processing unit determines that the sound originates from within the FoV of the camera,
wherein the camera includes a centerline, and
wherein determining if whether or not the sound originates within the FoV of the camera includes:
using a microphone array and sound source localization (SSL) to determine an angle of the sound; and
determining whether or not the sound originates within the FoV of the camera based on the determined SSL sound angle and the centerline and the FoV of the camera.

2. The method of claim 1, wherein the microphone array and the camera physically pan in synchronization.

3. The method of claim 1, wherein the pan axes of the microphone array and the camera are displaced.

4. The method of claim 1, wherein the microphone array and the camera are fixed in position and the camera uses electronic pan and zoom.

5. The method of claim 1,
wherein determining whether or not the sound originates within the FoV of the camera includes:
evaluating the image from the camera for the presence of individuals;
evaluating, in the image, each of the individuals for lip movement;
determining that the sound originates from within the FoV of the camera when lip movement is found for any of the individuals; and
determining that the sound does not originate from within the FoV of the camera when no lip movement is found for any of the individuals.

6. The method of claim 5,
wherein determining whether or not the sound originates within the FoV of the camera further includes:
determining that sound is present but no lip movement is found for any of the individuals;
using the microphone array and sound source localization (SSL) to determine the angle of the sound when sound is present but no lip movement is found for any of the individuals; and
determining when the sound originates within the FoV of the camera based on the determined SSL sound angle and the camera centerline and the FoV of the camera when sound is present but no lip movement is found for any of the individuals.

7. A videoconferencing device comprising:
a camera to provide an image, the camera having a field-of-view (FoV) and a centerline;
a microphone to receive sound and provide an audio signal to be transmitted in the videoconference;
a network interface to provide videoconference streams to at least one far site;
a processor coupled to the camera, the microphone and the network interface;
a microphone array, coupled to the processor, and providing audio output signals to the processor; and
memory coupled to the processor, the memory store programs executed by the processor,
wherein the processor is to perform, by executing programs and operations, videoconferencing operations of:
determining whether or not sound is present in the audio signal from the microphone;
determining whether or not the sound originates from within the FoV of the camera;
muting the microphone when the processor determines that the sound does not originate from within the FoV of the camera; and
unmuting the microphone when the processor determines that the sound originates from within the FoV of the camera,
wherein determining whether or not the sound originates within the FoV of the camera includes:
using the audio output signals from the microphone array to perform sound source localization (SSL) to determine an angle of the sound; and
determining when the sound originates within the FoV of the camera based on the determined SSL sound angle and the centerline and the FoV of the camera.

8. The videoconferencing device of claim 7, wherein the microphone array and the camera physically pan in synchronization.

9. The videoconferencing device of claim 7, wherein the pan axes of the microphone array and the camera are displaced.

10. The videoconferencing device of claim 7, wherein the microphone array and the camera are fixed in position and the camera uses electronic pan and zoom.

11. The videoconferencing device of claim 7,
wherein determining whether or not the sound is within the FoV of the camera includes:
evaluating the image from the camera for the presence of individuals;
evaluating each individual for lip movement;
determining that the sound does originate within the FoV of the camera when lip movement is found for any individual; and
determining that the sound does not originate within the FoV of the camera when no lip movement is found for any individual.

12. The videoconferencing device of claim 11, the videoconferencing device further comprising:
a microphone array providing audio output signals coupled to the processor,
wherein the camera includes a centerline, and
wherein determining whether or not the sound originates within the FoV of the camera further includes:
determining that sound is present but no lip movement is found for any individual;
using a microphone array and sound source localization (SSL) to determine an angle of the sound when sound is present but no lip movement is found for any individual; and
determining whether or not the sound originates within the FoV of the camera based on the determined SSL sound angle and the camera centerline and the FoV of the camera when sound is present but no lip movement is found for any individual.

13. A non-transitory processor readable memory containing programs that when executed cause a processor to perform the following method of selecting audio to be transmitted in a videoconference,
the method comprising:
reviewing an output of a microphone for sound;
providing an image from a camera, the camera having a field-of-view (FoV) and a centerline;
determining whether or not the sound originates from within the FoV of the camera;
muting the microphone when the processor determines that the sound does not originate from within the FoV of the camera; and
unmuting the microphone when the processor determines that the sound originate from within the FoV of the camera,
wherein determining whether or not the sound originates within the FoV of the camera includes:
using audio signal outputs from a microphone array and sound source localization (SSL) to determine an angle of the sound; and
determining whether or not the sound originates within the FoV of the camera based on the determined SSL sound angle and the centerline and the FoV of the camera.

14. The non-transitory processor readable memory of claim 13, wherein the microphone array and the camera physically pan in synchronization.

15. The non-transitory processor readable memory of claim 13, wherein the pan axes of the microphone array and the camera are displaced.

16. The non-transitory processor readable memory of claim 13, wherein the microphone array and the camera are fixed in position and the camera uses electronic pan and zoom.

17. The non-transitory processor readable memory of claim 13, wherein determining whether or not the sound originates within the FoV of the camera includes:
evaluating the image from the camera for the presence of individuals;
evaluating each individual for lip movement;
determining that the sound does originate within the FoV of the camera when lip movement is found for any individual; and
determining that the sound does not originate within the FoV of the camera when no lip movement is found for any individual.

\* \* \* \* \*